DIGITAL COMPUTER WITH MEMORY LOCK OPERATION

Original Filed June 7, 1965 3 Sheets-Sheet 1

INVENTORS
CARL B. CARLSON
ROBERT V BOCK
BY
Christie, Parker & Hale
ATTORNEYS

DIGITAL COMPUTER WITH MEMORY LOCK OPERATION

Original Filed June 7, 1965 3 Sheets-Sheet 2

INVENTORS.
CARL B. CARLSON
ROBERT V. BOCK

BY Christie, Parker & Hale
ATTORNEYS.

DIGITAL COMPUTER WITH MEMORY LOCK OPERATION

Original Filed June 7, 1965 3 Sheets-Sheet 3

INVENTORS
CARL B. CARLSON
ROBERT V. BOCK
BY Christie, Parker & Hale
ATTORNEYS

United States Patent Office

Re. 27,791
Reissued Oct. 30, 1973

27,791
DIGITAL COMPUTER WITH MEMORY LOCK OPERATION

Carl B. Carlson, Santa Barbara, Calif., and Robert V. Bock, Malvern, Pa., assignors to Burroughs Corporation, Detroit, Mich.

Original No. 3,398,405, dated Aug. 20, 1968, Ser. No. 461,923, June 7, 1965. Application for reissue Oct. 8, 1969, Ser. No. 871,491
Int. Cl. G06f *11/10, 15/16*
U.S. Cl. 340—172.5 19 Claims

Matter enclosed in heavy brackets [ ] appears in the original patent but forms no part of this reissue specification; matter printed in italics indicates the additions made by reissue.

ABSTRACT OF THE DISCLOSURE

There is described a computer system in which a specific command in a processor sets a flag bit in a word in memory at the time the processor reads this word out of memory. The flag bit then indicates, whenever that particular word is accessed in memory, that the word is "locked" and may be used to prevent use of the word until the flag bit is reset.

This invention relates to digital computers and, more particularly, is concerned with a "lock" on any data stored in main memory or any peripheral storage apparatus used in connection with the computer.

Multi-processing or multi-programming operation of digital computer systems has been developed to take advantage of the high speed operation of processors. For example, a computer system may include several processors operating with a plurality of memory modules so that the same data may be accessed for two different programs or utilized in two different processors at substantially the same time. It is possible under such arrangements where a common information base is being used for more than one processor or in connection with more than one program, that while one piece of data is being modified, another processor, or the same processor using another program, may access the same word in memory to modify or use this data.

It has been the practice heretofore to provide information on the status of a file or array of data by programming. A group of words are set aside in memory and used to establish the status of data, such as an array of data in the core memory or a magnetic tape file or the like. By proper programming, the status table must always be referenced before going to a file to determine if the file is available for use with a particular program. Thus the word in the status table operates as a "key" for locking or unlocking a file. When the word in the status table indicates that a file is unlocked, any program may operate on it. However, when a word in the status table is modified to indicate that the file is locked, only the program which established the locked condition can operate on that file.

In such an arrangement, a series of program steps or instructions must be established by which the status table is interrogated before operating on any file. If the status table indicates that the file is locked, the program instructions must be such as to delay access to that file and establish some alternative mode of operation for the processor. On the other hand, if this status table indicates that the file is open, the program must follow a series of instructions by which the status word is brought out of memory, modified to indicate that the file is now locked and return it to the status table in memory before accessing the data in the file itself.

However, in multi-processing or multi-programming systems, during the time a status word is read out of memory into the processor, examined and then stored back in memory by the processor with the word modified to indicate that the corresponding file is locked, it is possible for a second processor to read the same status word before it has been modified so as to lock the designated file. Thus two programs can now proceed to operate on the same file and the attempt to program a locked condition of a file through the status word table will have failed.

The present invention provides an arrangement by which during the execution of a read-out instruction of any word from memory, the word can at the same time be modified in the memory to indicate that the word or the file or array of data which it designates is locked and therefore inaccessible to other processors or other programs.

The present invention accomplished this by providing in a digital computer system a program instruction called a Read With Lock. When this instruction is encountered in executing a stored program in the computer system, an access to memory is instituted. Preferably, a magnetic core memory is employed in which the binary bits forming the word are stored in magnetic form in cores. The read-out operation from a core memory is self-destructive of the information and therefore the complete read-out operation normally requires that the word be rewritten in the cores during the memory cycle to prevent loss of the information in the memory. When a Read With Lock instruction is encountered, according to the teaching of the present invention, means is provided to set at least one bit in the word when it is rewritten into the core memory in completing the memory cycle. The next time the word is read out of memory the bit that is set provides a flag to the processor that the word has been previously read out of memory. The flag bit is used to prevent any modification or further use of the word as an address to a file of data, for example, until the bit is reset by replacing the word in memory through the normal Store instruction.

For a more complete understanding of the invention, reference should be made to the accompanying drawings wherein.

Figure 1:
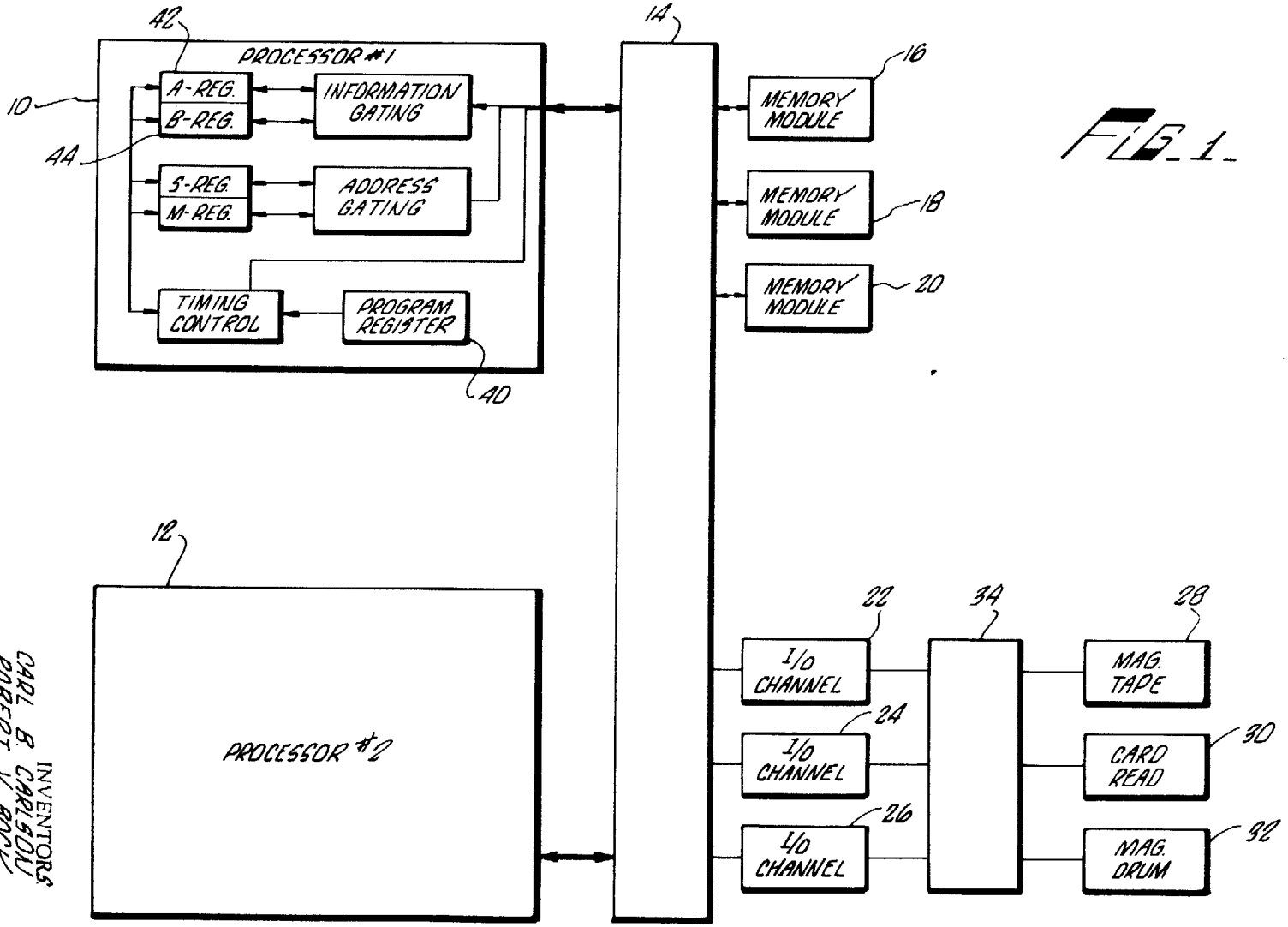
FIG. 1 is a block diagram of a multi-processor computer system incorporating the present invention.

Referring to FIG. 1, there is shown a data processing system such as described in more detail in copending application Ser. No. 89,866, filed Feb. 16, 1961, by the same assignee as the present application, now Pat. No. 3,200,380. Such a system may include one or more processors, two of which are shown by way of example and indicated at 10 and 12. Each processor is arranged to communicate through a switch interlock circuit 14 with any selected one of a number of memory modules such as indicated at 16, 18 and 20. Also each processor can communicate through the switch interlock with any one of a plurality of input-output channel control circuits such as indicated at 22, 24 and 26. Each input-output channel in turn may be connected to any one of a number of input-output units, such as a magnetic tape unit 28, a card reader 30 or a magnetic drum 32, for example, through an input-output exchange circuit 34. The system operates such that when any processor needs to communicate with a memory module, an address is generated within the processor which not only addresses a particular word in a memory module but also designates which of the plurality of memory modules is to be used. The address controls the switch interlock 14 to connect the selected memory module to the processor during a memory cycle in which a word is transferred from memory to the processor or from the processor to the memory.

When information is required from a peripheral unit such as the magnetic tape unit 28, a word is generated in the processor known as a Descriptor. A Descriptor is transferred to one of the input-output channels where it is used to control the transfer between a designated terminal unit such as a magnetic tape transport 28 and a designated one of the memory modules.

Figure 2:
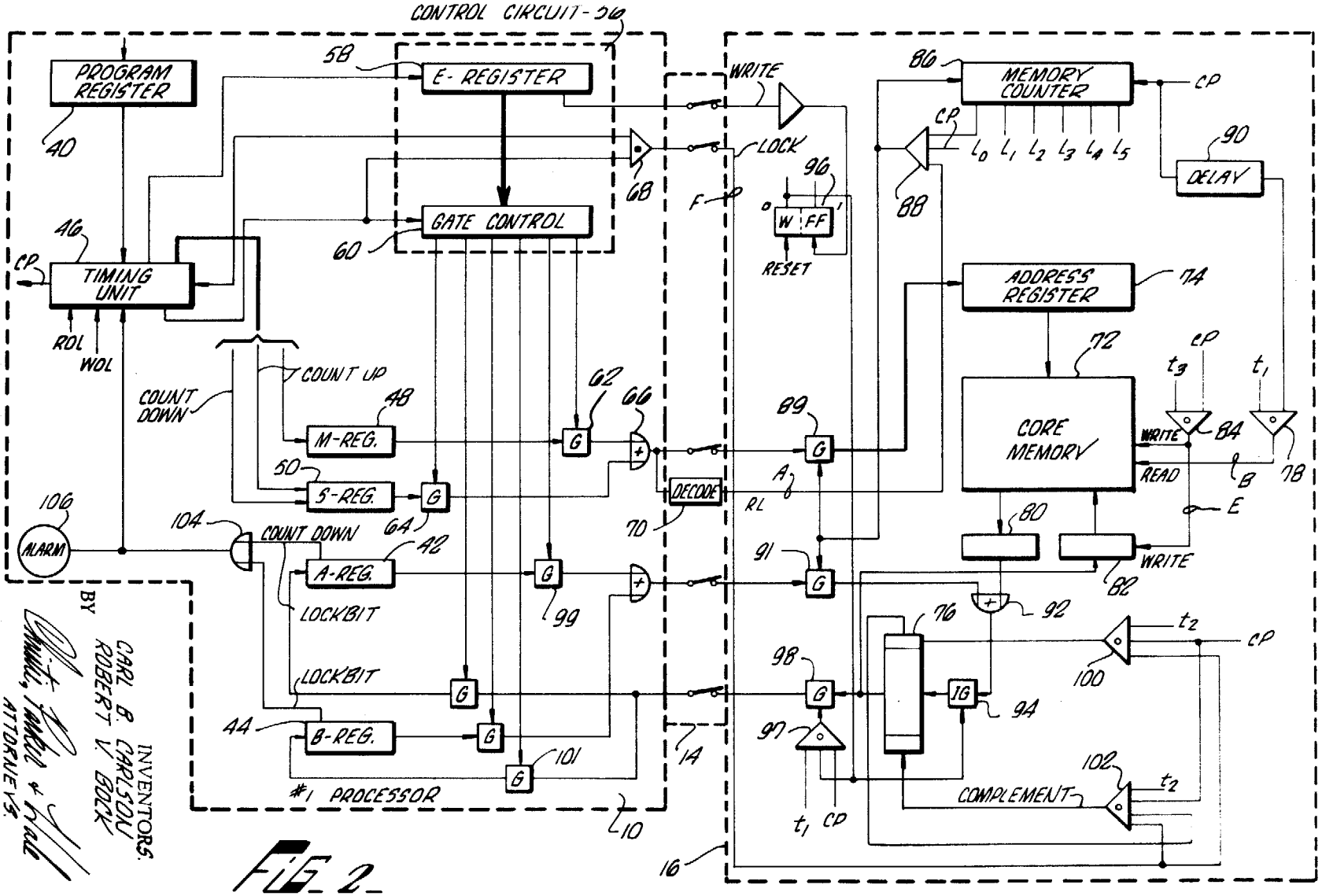
FIG. 2 is a schematic block diagram showing one embodiment of the present invention.

In a data processing system such as that shown in FIG. 1 and described more fully in the above-identified copending application, it is possible for both processors 10 and 12 to access the same information in a particular memory module or a particular peripheral unit. As pointed out above, a problem may arise where one processor may be modifying data under one program and the same data is accessed by another program. The present invention provides a special program instruction which permits a particular word in a memory module to be transferred to a processor and at the same time that word be "locked" so that it cannot be used by the other processor or by a different program with the same processor. The manner in which this Read With Lock instruction is implemented in the data processing system of FIG. 1 is described in detail in connection with FIG. 2.

The processor 10 is shown as including a program register 40 which stores each instruction comprising the program for the processor. Each instruction is transferred into the program register 40 from a program stored in a memory module in a manner described in more detail in copending application Ser. No. 242,002, filed Dec. 3, 1962, and assigned to the same assignee as the present application. Instructions generally are of two types, one of which calls for some arithmetic operation and the other of which calls for a memory access operation either for reading words from a selected memory module into the processor or writing words from the processor into the memory module. Instructions which call for an arithmetic operation utilize operands stored in an A-register 42 and a B-register 44. Instructions of this type are not pertinent to the present invention except to note that operands must first be placed in the A-register 42 and the B-register 44 from a memory module, such as the module 16, in response to a previous Memory Read instruction such as a Memory Read With Lock instruction.

Assuming that a Read With Lock instruction has been loaded in the program register 40, a timing unit 46 decodes the instruction and generates a sequence of timing signals which control the processor to effect the transfer of a word from a memory module to the processor.

The address necessary to do a memory operation is stored in either of two registers, designated the M-register 48 and S-register 50. Both registers are in the form of counters which can be counted in response to signals from the timing unit 46.

As described in more detail in application Ser. No. 242,-002, filed December 3, 1962, and assigned to the same assignee as the present application, when the instruction in the program register 40 calls for a memory access, the timing unit 46 decodes the instruction in the register 40 and provides timing signals to a control circuit 56. The timing signals applied to the control circuit specify whether a read or write operation is to take place in the memory unit 16 and designate whether the address contained in the M-register 48 or the S-register 50 is to be used in addressing the memory unit 16. The timing signals also designate which one of the A and B-reigsters 42 and 44 is to be used for the transfer of a word of information between the processor 10 and the memory unit 16.

The control circuit 56 contains an E-register 58. The E-register 58 is set into a unique state by the timing signals provided by the timing unit 46 and thereby provides a stored indication of the memory access operation which is to be performed. For the Read With Lock instruction, the E-register 58 is set to initiate a memory read operation using the address in the M-register 48 and transferring the word from memory to either the A-register 42 or the B-register 44.

The E-register 58 is set for a memory read operation and through a gate control circuit 60 controls a gate 62 or 64. The address in either the M-register 48 or the S-register 50 is thereby gated by a logical OR circuit 66 to the memory unit 16 through the switch interlock 14. The switch interlock is shown schematically as a series of switches by means of which connections are completed between the processor 10 and the particular memory unit 16. At the same time, a signal from the timing unit 46, which is set by the decoder in the timing unit 46 when a Read With Lock instruction is provided in the program register 40, is applied to a logical AND circuit 68 together with an output line from the E-register 58, indicating that a memory read cycle is being initiated. The output of the logical AND circuit 68 is also connected through the switch interlock 14 to the memory unit 16.

The interlock circuit 14 includes a decoder 70 coupled to the output of the logical OR circuit 66. The decoder, in response to an address being gated into the memory unit 16, energizes a control line RL which signals the memory unit 16 that a memory access is being made to the particular memory unit. In addition, a line from the E-register 58 is energized when a memory write cycle is to take place but is not energized when a memory read cycle is taking place. For the purpose of the present discussion, we are only concerned with a memory read operation and so no signal need be provided on the "write" line.

The memory unit 16 includes a conventional coincident current type of magnetic core memory unit 72. An address register 74 stores the address information derived from the processor by which a word is selected in the core memory 72 to be read out into an information register 76. Read-out from the core memory 72 takes place in response to a pulse applied to the core memory from a logical AND circuit 78 through a group of output amplifiers 80. Since core memories involve a destructive read out, the information is restored in the same address in the core memory by a plurality of driver amplifiers 82 controlled in response to the bit stored in the information register 76 by a write pulse derived from the output of a logical AND circuit 84.

Operation of the memory unit in performing a memory cycle is controlled by a memory counter 86. An output signal on the line RL from the decoder 70 is applied to an AND circuit together with the initial state of the memory counter 86, designated $t_0$, and a clock pulse. Thus when the output of the decoder 70 indicates that a memory cycle is to be initiated, the output of the AND circuit 88 is used to advance the memory counter into the $t_1$ state.

At the same time the output of the AND circuit 88 strobes a pair of gates 89 and 91 for loading the address register 74 from the M-register or S-register and for loading the information register, in the case of a memory write operation, from the A-register or B-register.

The $t_1$ state of the memory counter 86 is applied to the AND circuit 78 together with a clock pulse which is delayed a fraction of a clock pulse interval by a delay circuit 90. This is shown in the timing diagram of FIG. 3 which shows at (A) the signal on the line RL which exists for one clock pulse interval and corresponds to the $t_0$ state of the memory counter 86. The memory counter 86 changes to the $t_1$ state with the next clock pulse, at which time the memory counter 86 changes to the $t_2$ state.

Figure 3:
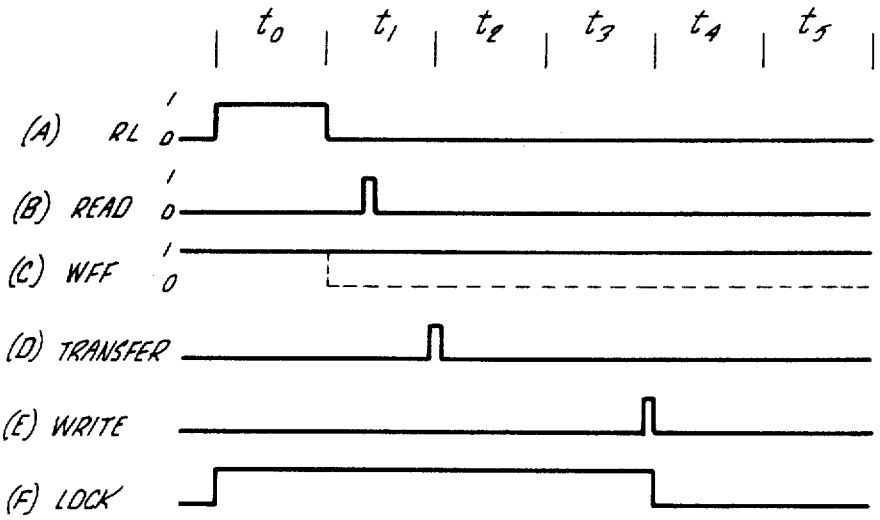
FIG. 3 is a timing diagram useful in explaining the operation of the invention.

The waveform (B) of FIG. 3 shows the delay pulse at the output of the AND circuit 78. This pulse is applied to the core memory 72 causing a read out of the word selected by the address register 74. The word is amplified by the read-out amplifiers 80 and coupled to the information register 76 through a logical OR circuit 92, and an inhibit gate 94. The inhibit gate 94 is controlled by a flip-flop 96. The flip-flop 96 is normally in the 0 or "off" condition when a memory read operation is to take place and is set in the 1 or "on" condition by the "Write" line from the E-register 58. Thus the gate 94 applies the word read out of the memory 72 into the register 76 for a memory read cycle but inhibits the transfer of the word during a memory write cycle. The signal from the flip-flop 96 as applied to the gate 94 is shown in FIG. 3(C).

The word stored in the information register 76 is transferred to the A-register 42 or the B-register 44 by means of a gating circuit 98 in the memory module 16. The gating circuit 98 is strobed by a clock pulse at the end of the $t_1$ state of the memory counter 86 by means of an AND circuit 97 to which is applied the $t_1$ state and the Read level from the flip-flop 96. The strobe pulse at the output of the AND circuit 97 transfers the word in the information register 76 through the switch interlock 14 to the A-register 42 or B-register 44 through gate 99 or gate 101 as determined by the gate control circuit 60.

When the memory counter 86 advances to the $t_3$ state, the next clock pulse is passed by the AND circuit 84 and is used to strobe the driver amplifiers 82 by which the word stored in the information register 76 is rewritten back in the same address location of the core memory 72. During the $t_4$ and $t_5$ states, the memory module is returned to its initial condition by resetting of various logic flip-flops and the like, as described in more detail in the above-identified patent application Ser. No. 242,002.

When a Read With Lock operation is to take place in accordance with the teaching of the present invention, as pointed out above, a signal is provided at the output of the AND circuit 68 which is applied to the memory module 16. The lock signal, the waveform being shown in FIG. 3(F), is applied to a logical AND circuit 100 and a logical AND circuit 102. The logical AND circuit 100 also receives a clock pulse and the $t_2$ level from the memory counter 86. The output of the AND circuit 100 is a pulse occurring at the end of the $t_2$ state of the memory counter 86 and is used to set one flip-flop in the register 76 to the "on" or 1 state. The corresponding bit in the word stored in the information register is thereby set to indicate that the word has just been accessed from the memory 72 and is being transferred to a processor. The AND circuit 102 also senses that the memory counter 86 is in the $t_2$ state and that a Read With Lock operation is taking place and also senses that the information register flip-flop controlled by the AND circuit 100 is in its "0" state. If all conditions are true, the output of the AND circuit 102 complements the flip-flop in the information register 76 which contains the parity bit. In this way, the parity is corrected at the same time the bit indicating a Lock condition is set by the output of the AND circuit 100. If the Lock bit had already been set to 1 during a previous memory cycle, no complementing would take place and the parity bit would remain the same.

By setting the Lock bit in the word stored in the information register 76 before it is rewritten in the core memory 72, a flag signal is provided which on any subsequent memory access of the same word, gives an indication of the previous access to that same word. Since this flag is automatically set during one memory cycle, there is no way the same word can be accessed by two processors without the flag being set by the first processor to access the word.

When a word is transferred to the A-register 42 or B-register 44, the Lock bit is sensed and applied through a logical OR circuit 104 to an alarm 106, for example. The same signal may also be applied to the timing unit 46 to interrupt or modify the operation of the processor when a "locked" word has been accessed from memory.

From the above description, it will be recognized that the present invention provides means for flagging that a word in memory has previously been accessed. The word may be a "status" word providing address information to a file of data, such as a Descriptor word. The "locked" condition may be subsequently removed by using a conventional "Store" instruction in which the word is again stored in memory in its original "unlocked" condition.

What is claimed is:

1. A digital computer system comprising a first register for storing program words, a second register for storing memory address words, a third register for storing operand words, an addressable storage facility for storing a plurality of words, means responsive to a predetermined program word in the first register and the address word in the second register for transferring a selected word from the memory facility to the third register, means operatively associated with the storage facility for setting a predetermined bit of any word addressed in the storage facility to one binary value, and means responsive to said predetermined word in the first register for actuating said bit setting means to modify the addressed word after the addressed word is transferred from the storage facility to the third register, whereby the word is received in the third register in unmodified form but the word is modified as stored in the storage facility.

2. Apparatus as defined in claim 1 including means operatively associated with the storage facility for changing a second bit in the word when said first bit is set by said bit setting means.

3. In a computer system having a plurality of digital processors each adapted to access a common addressable storage facility, the improvement comprising means including a register associated with the addressable storage facility for transferring a selected word from an addressable location into the register, means for transferring a word from the register to a selected location in the storage facility, means responsive to a first signal from one of said processors for loading said register from a selected location in the storage facility and transferring said word from the register to the processor, means responsive to a second signal from said one of the processors for modifying at least one bit in said register and initiating transfer of said modified word by said transferring means into the same selected location in the storage facility, and means in each of the processors sensing at least one bit in a word transferred from the storage facility to the processor for indicating to the processor that the word has been modified.

4. In a computer system having at least one processor adapted to access an addressable storage facility, the improvement comprising means including a register associated with the addressable storage facility for transferring a selected word from an addressable location into the register, means for transferring a word from the register to a selected location in the storage facility, means responsive to a first signal from said processor for loading said register from a selected location in the storage facility and transferring said word from the register to the processor, means responsive to a second signal from the processor for modifying at least one bit in said register and initiating transfer of said modified word by said transferring means into the same selected location in the storage facility, and means in the processor sensing at least one bit in a word transferred from the storage facility to the processor for indicating to the processor that the word has been modified.

5. A computer system comprising at least one addressable storage facility and at least one digital processor, the storage facility including an address register, an information register, and means responsive to a first signal from the processor for transferring a word from the address location in the storage facility designated by the address register to the information register and back into the same address location in the storage facility, means controlled by the processor for transferring the word in the information register to the processor, means responsive to a second signal from the processor for setting at least one bit to a predetermined binary value in the information register, timing means for actuating the bit setting means in response to said second signal after the word in the information register is transferred to the processor and before the word in the information register is transfered into the same addess in the storage facility, and means for sensing and indicating that said one bit has been set in any word received by the processor from the storage facility.

6. A computer system comprising at least one addressable storage facility and at least one digital processor, the storage facility including an address register, an information register, and means responsive to a first signal from the processor for transferring a word from the address location in the storage facility designated by the address register to the information register and back into the same address location in the storage facility, means controlled by the processor for transferring the word in the information register to the processor, means responsive to a second signal from the processor for setting at least one bit to a predetermined binary value in the information register, and timing means for actuating the bit setting means in response to said second signal after the word in the information register is transferred to the processor and before the word in the information register is transferred into the same address in the storage facility.

7. In a computer in which coded words forming a stored program of instructions are read out from storage into a program control register and executed by a control circuit in a predetermined sequence, apparatus comprising a core memory unit for storing a plurality of digitally coded words in addressable storage locations including means for destructively reading out a selected word from the core memory unit into a register and means for rewriting the word back into the same location in memory to restore the word during one complete memory cycle, means responsive to a predetermined program word in the program control register for initiating a memory cycle, and means responsive to said predetermined program word for setting one bit in the selected word read out of the core memory unit as it is rewritten back in the core memory unit during the same memory cycle.

8. In a computer in which coded words forming a stored program of instructions are read out from storage into a program control register and executed by a control circuit in a predetermined sequence, apparatus comprising a memory unit for storing a plurality of digitally coded words in addressable storage locations including means for reading out a selected word from the memory unit into a register and means for rewriting the word back into the same location in memory to restore the word during one complete memory cycle, means responsive to a predetermined program word in the program control register for initiating a memory cycle, and means responsive to said predetermined program word for setting one bit in the selected word read out of the memory unit as it is rewritten back in the memory unit during the same memory cycle.

*9. In a data processing system including a storage, a storage access control, comprising:*

*a registering apparatus having binary register locations capable of storing data manifestations in the form of different bit configurations representing corresponding different values;*

*means for accessing said register locations so as to derive data manifestations therefrom;*

*and forcing means operative, directly as a result of an access by said means for accessing and independently from the contents of said register locations, to set a pre-established bit configuration in said register locations, said pre-established bit configuration identifying the accessibility of said storage.*

*10. The device described in claim 9 wherein all of the bits in said pre-established bit configuration are of the same value.*

*11. The device described in claim 9 wherein said forcing means for the setting of said pre-established bit configuration operates so as to provide said setting prior to the possibility of any further accessing of said register locations.*

*12. The device described in claim 10 wherein said bits are set to all ONE's.*

*13. The device described in claim 10 wherein said bits are set to all ZERO's.*

*14. The device described in claim 9 wherein said forcing means includes means for selectively modifying the output of the memory data register.*

*15. In a data processing system including a storage, a storage access control comprising:*

*a registering apparatus having register locations capable of storing data manifestations in the form of different bit configurations representing correspond- different values;*

*means for accessing said register locations so as to derive data manifestations therefrom;*

*forcing means operative to set a pre-established bit configuration in said register locations, said pre-established bit configuration identifying the accessibility of said storage;*

*and means to test the data significance of the data manifestations derived from said register locations.*

*16. The device described in claim 12 wherein only a portion of the data manifestations of said register locations is tested for control significance.*

*17. In a data processing system including a plurality of storage units and a plurality of processing units, an apparatus for controlling processing unit access to the storage units comprising:*

*a plurality of registers where each storage unit is associated with a different one of said registers and where each register includes register locations capable of storing different data manifestations in the form of different bit configurations;*

*accessing means, controlled by each processing unit, for accessing any of said registers so as to derive accessed data manifestations from an accessed register;*

*forcing means operative, directly as a result of an access by said accessing means and independently from the contents of said accessed register, to set a pre-established bit configuration in said accessed register which identifies an accessibility condition of a storage unit associated with said accessed register;*

*and means controlled by each processing unit to test said accessed data manifestations so as to determine the accessibility of the storage unit associated with said accessed register.*

*18. The data processing system of claim 14 further including resetting means for resetting said accessed register with a bit configuration which identifies another accessibility condition of the storage unit associated with said accessed register.*

*19. In a data processing system including a storage unit and a processing unit, an apparatus for controlling processing unit access to the storage unit comprising:*

*a plurality of registers where portions of each storage unit are associated with a different one of said registers and where each register includes register locations capable of storing different data manifestations in the form of different bit configurations;*

*accessing means, controlled by a processing unit, for accessing any of said registers so as to derive accessed data manifestations from an accessed register;*

*forcing means operative, directly as a result of an access by said accessing means and independently from the contents of said accessed register, to set a pre-established bit configuration in said accessed register which identifies an accessibility condition of a storage unit portion associated with said accessed register;*

*and means controlled by each processing unit to test said accessed data manifestations so as to determine the accessibility of the storage unit portion associated with said accessed register.*

References Cited

The following references, cited by the Examiner, are of record in the patented file of this patent or the original patent.

UNITED STATES PATENTS

| | | | |
|---|---|---|---|
| 3,108,257 | 10/1963 | Buchholz | 340—172.5 |
| 3,158,844 | 11/1964 | Bowdle | 340—172.5 |
| 3,264,615 | 8/1966 | Case et al. | 340—172.5 |
| 3,317,898 | 5/1967 | Hellerman | 340—172.5 |

GARETH D. SHAW, Primary Examiner